(12) United States Patent
Errico et al.

(10) Patent No.: US 7,791,596 B2
(45) Date of Patent: Sep. 7, 2010

(54) TOUCH INPUT DEVICE HAVING INTERLEAVED SCROLL SENSORS

(75) Inventors: Michael Errico, Thousand Oaks, CA (US); Jeffrey R. Baker, Thousand Oaks, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 1124 days.

(21) Appl. No.: 11/318,800

(22) Filed: Dec. 27, 2005

(65) Prior Publication Data

US 2007/0146349 A1 Jun. 28, 2007

(51) Int. Cl.
*G09G 5/00* (2006.01)

(52) U.S. Cl. .................. 345/174; 257/773; 345/156

(58) Field of Classification Search ............. 345/156, 345/168, 170, 174, 184
See application file for complete search history.

(56) References Cited

U.S. PATENT DOCUMENTS

| | | |
|---|---|---|
| 4,235,141 A | 11/1980 | Eventoff |
| 4,268,815 A | 5/1981 | Eventoff |
| 4,276,538 A | 6/1981 | Eventoff et al. |
| 4,301,337 A | 11/1981 | Eventoff |
| 4,314,227 A | 2/1982 | Eventoff |
| 4,314,228 A | 2/1982 | Eventoff |
| 4,315,238 A | 2/1982 | Eventoff |
| 4,451,714 A | 5/1984 | Eventoff |
| 4,482,883 A | 11/1984 | Heredero |
| 4,489,302 A | 12/1984 | Eventoff |
| 4,494,105 A | 1/1985 | House |
| 4,739,299 A | 4/1988 | Eventoff et al. |
| 4,810,992 A | 3/1989 | Eventoff |
| 4,963,702 A | 10/1990 | Yaniger et al. |
| 5,053,585 A * | 10/1991 | Yaniger ................. 178/18.05 |
| 5,151,677 A | 9/1992 | Gernet et al. |
| 5,296,837 A | 3/1994 | Yaniger |
| 5,302,936 A | 4/1994 | Yaniger |
| 5,353,004 A | 10/1994 | Takemoto et al. |
| 5,659,334 A | 8/1997 | Yaniger et al. |
| 5,828,363 A | 10/1998 | Yaniger et al. |
| 5,952,912 A | 9/1999 | Bauer et al. |
| 2002/0104369 A1 | 8/2002 | Baker et al. |
| 2005/0259069 A1 * | 11/2005 | Baker et al. ............... 345/156 |
| 2005/0259085 A1 | 11/2005 | Baker et al. |

\* cited by examiner

*Primary Examiner*—Henry N Tran
*Assistant Examiner*—Christopher E Leiby
(74) *Attorney, Agent, or Firm*—Brooks Kushman P.C.

(57) ABSTRACT

A touch input device includes two or more interleaved scroll sensors. A common area is interposed between two of the scroll sensors. A sense line snakes through the common area. Scrolling pressure applied to a sense layer causes the sense layer to contact and electrically connect the sense line to the scroll sensors thereby permitting the scrolling pressure position to be determined by measuring a voltage on the sense line. The scroll sensors are potentiometric and may be linear strip scroll sensors or rotary ring scroll sensors. The interleaved scroll sensors with the common area allow smooth scrolling action from one major leg to another major leg.

11 Claims, 5 Drawing Sheets

TOUCH INPUT DEVICE HAVING INTERLEAVED SCROLL SENSORS

BACKGROUND OF THE INVENTION

1. Field of the Invention

The present invention relates to scroll sensors.

2. Background Art

A scroll sensor is useful for human input to an electronic device for purposes of menu selection, parameter control, etc. A scroll sensor is typically planar in the shape of a strip or a ring, and is typically built in the front face of an electronic device. A user activates a scroll sensor by touching or sliding on the sensor surface with a finger or an implement such as a stylus. The scrolling action may be linear, rotational, or along a more complex path.

Electronic devices that benefit from the utility of scroll sensors include cell phones, personal media players, personal digital assistants, portable gaming devices, cameras, remote controls, etc. Such electronic devices typically have a display with a graphical user interface (GUI) that may give feedback during scrolling actions. For example, changing the volume on a music player might be indicated on a GUI by a moving bar whose length is proportional to volume.

An example of a portable electronic device with a linear strip scroll sensor is the iRiver H10 mp3 player. Touching the strip scroll sensor and moving, or touching the strip scroll sensor at one end and holding, accomplishes various actions such as song selection, volume control, etc.

An example of a portable electronic device with a rotary ring scroll sensor is the Apple iPod. Touching the ring scroll sensor and scrolling around accomplishes various actions such as changing the volume, where the size of the change is proportional to the angular travel of the touch.

Portable electronic devices are trending toward increased functionality without a corresponding increase in physical size. The increased functionality is accompanied by a requirement for increased user input and interaction. There is therefore a demand for touch input devices such as mouse pointing sensors, strip scroll sensors, and ring scroll sensors which can be used in electronic devices.

A scroll sensor can be used for controlling a single parameter at a time, for example, the audio volume on an mp3 player. Subsequently, the same scroll sensor can be used for a second function such as scrolling through song lists. However, the scroll sensor cannot perform both functions at once. Switching between the two functions requires a function selection step such as context-sensitive switching or a button to actively switch which of the functions the scroll sensor will perform.

If multiple functions are to be simultaneously available without the provision of a function selection step, then multiple scroll sensors could be provided. This reduces the number of function selection steps and provides a more intuitive control. However, in order to enable smooth motions from one scroll sensor to the other scroll sensor it is desirable that the multiple scroll sensors be touching or even intersecting. Furthermore, to maintain pleasing aesthetics it is desirable that the multiple scroll sensors appear to be a single scroll sensor. Thus, what is needed is a touch input device having interleaved scroll sensors.

SUMMARY OF THE INVENTION

Accordingly, it is an object of the present invention to provide a touch input device having two or more interleaved scroll sensors.

It is another object of the present invention to provide a touch input device having two or more interleaved linear strip scroll sensors.

It is a further object of the present invention to provide a touch input device having two or more interleaved rotary ring scroll sensors.

It is still another object of the present invention to provide a touch input device having interleaved potentiometric scroll sensors which form a common interaction zone that allows for smooth scrolling across the entire surface of the touch input device.

It is still a further object of the present invention to provide a method for determining the position of a touch on a touch input device having two or more interleaved scroll sensors.

In carrying out the above objects and other objects, the present invention provides a touch input device having a bottom substrate, first and second resistors on the bottom substrate, a first pair of drive lines electrically connected to respective ends of the first resistor for applying a voltage across the first resistor, and a second pair of drive lines electrically connected to respective ends of the second resistor for applying a voltage across the second resistor. The touch input device further includes a plurality of first and second finger traces on the bottom substrate. The first finger traces are electrically connected to and extend from the first resistor at discrete points across the resistor such that each first finger trace carries a voltage corresponding to a voltage applied across the resistor and the position of the first finger trace across the first resistor. The second finger traces are electrically connected to and extend from the second resistor at discrete points across the resistor such that each second finger trace carries a voltage corresponding to a voltage applied across the resistor and the position of the second finger trace across the second resistor. The touch input device further includes a top substrate spaced above the bottom substrate. The top substrate has a conductive sense layer. The touch input device further includes a sense line having an electrically contiguous set of sense finger traces on the bottom substrate. The sense finger traces are interdigitated with the first and second finger traces. Pressure applied to either substrate causes the conductive sense layer to contact and electrically connect the sense finger traces to at least one of the first and second finger traces thus permitting the position of the applied pressure to be determined by measuring the voltage on the sense line. Each resistor is linear such that the resistance per unit length across the resistor is substantially constant.

In one embodiment, the bottom substrate includes a cross-shaped section having a center region and four arms. The resistors respectively extend at right-angles through a respective pair of the arms with the center region being interposed between the resistors. Some of the sense finger traces are located in the center region, some of the first finger traces extend towards the center region and are interleaved with the sense finger traces in the center region, and some of the second finger traces extend towards the center region and are interleaved with the sense finger traces in the center region. Some of the sense finger traces are located in the two arms through which the first resistor extends, some of the first finger traces extend towards these arms and are interdigitated with the sense fingers located in these arms, some of the sense fingers are located in the other two arms through which the second resistor extends, and some of the second finger traces extend towards these other arms and are interdigitated with the sense fingers located in these other arms.

Pressure applied to either substrate in the center region causes the conductive sense layer to contact and electrically connect some of the sense finger traces in the center region to at least some of the first and second finger traces in the center region thus causing both resistors to effect the voltage on the sense line. The position of the applied pressure is permitted to be determined by measuring the voltage on the sense line and by measuring the effects of the resistors to the voltage on the sense line. The position of the applied pressure is permitted to be mapped to X and Y coordinates relative to the cross-shaped section using look-up tables.

Pressure applied to either substrate in one arm causes the conductive sense layer to contact and electrically connect some of the sense finger traces in the one arm to at least one of the finger traces in the one arm thus causing the resistor which extends through the one arm to effect the voltage on the sense line while the other resistor does not effect the voltage on the sense line. The position of the applied pressure is permitted to be determined by measuring the voltage on the sense line and by measuring the effect of the resistor extending through the one arm to the voltage on the sense line.

In another embodiment, the bottom substrate includes dual arc-shaped sections having a center region. The resistors respectively extend at arcs with the center region being interposed between the resistors. Pressure applied to either substrate in the center region causes the conductive sense layer to contact and electrically connect some of the sense finger traces in the center region to at least some of the first and second finger traces in the center region thus causing both resistors to effect the voltage on the sense line. The position of the applied pressure is permitted to be determined by measuring the voltage on the sense line and by measuring the effects of the resistors to the voltage on the sense line. The position of the applied pressure is permitted to be mapped to X and Y coordinates relative to the dual arc-shaped sections using look-up tables.

In another embodiment, the bottom substrate includes dual circular-shaped sections. The resistors are circular and are positioned in respective circular-shaped sections with a center region of the dual circular-shaped sections being interposed between the resistors. Pressure applied to either substrate in the center region causes the conductive sense layer to contact and electrically connect some of the sense finger traces in the center region to at least some of the first and second finger traces in the center region thus causing both resistors to effect the voltage on the sense line. The position of the applied pressure is permitted to be determined by measuring the voltage on the sense line and by measuring the effects of the resistors to the voltage on the sense line. The position of the applied pressure is permitted to be mapped to X and Y coordinates relative to the dual circular-shaped sections using look-up tables.

Further, in carrying out the above objects and other objects, the present invention provides a touch input device having a first scroll sensor and a second scroll sensor interleaved with the first scroll sensor such that the scroll sensors share a common area. A sense line snakes through the common area. Scrolling pressure applied to a sense layer causes the sense layer to contact and electrically connect the sense line to the scroll sensors thereby permitting the scrolling pressure position to be determined by measuring a voltage on the sense line. The scroll sensors may be linear strip scroll sensors or rotary ring scroll sensors.

The sense line further snakes through a first area of the first scroll sensor. Scrolling pressure applied to the sense layer causes the sense layer to contact and electrically connect the sense line to the first scroll sensor while the second scroll sensor is electrically disconnected from the sense line thereby permitting the scrolling pressure position to be determined by measuring a voltage on the sense line. The sense line further snakes through a second area of the second scroll sensor. Scrolling pressure applied to the sense layer causes the sense layer to contact and electrically connect the sense line to the second scroll sensor while the first scroll sensor is electrically disconnected from the sense line thereby permitting the scrolling pressure position to be determined by measuring a voltage on the sense line.

The above objects and other objects, features, and advantages of the present invention are readily apparent from the following detailed description when taken in connection with the accompanying drawings.

DETAILED DESCRIPTION OF THE PREFERRED EMBODIMENT(S)

A scroll sensor in accordance with the present invention is a planar potentiometric touch sensor for determining the location of a touch and produces an electrical signal indicative of applied pressure at the location being touched. The scroll sensor is a planar device having top and bottom substrates spaced apart from one another and held together at their edges with an adhesive spacer layer. The scroll sensor is planar in the sense that while it may be many tens of millimeters across in length and width, it is on the order of a fraction of a millimeter thick. The scroll sensor is potentiometric in that it contains a resistive element across which a potential is placed and a sense element that contacts the resistive element such that the voltage seen by the sense element is proportional to the location of the contact. The scroll sensor is a touch sensor in that its size and operational force range are suitable for the detection of light human finger force.

Figures 1, 3:
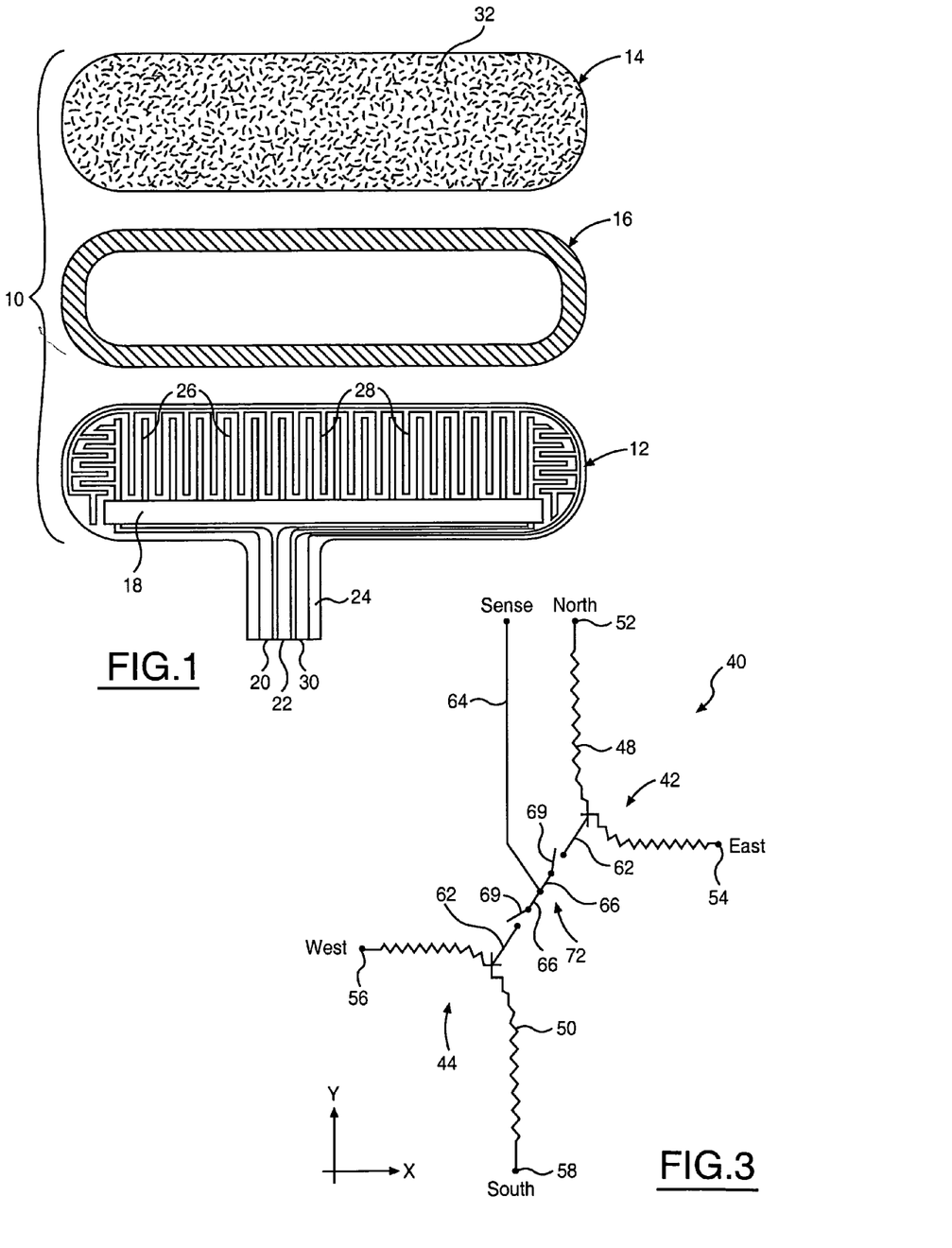
FIG. 1 illustrates an exploded view of a single linear strip scroll sensor.
FIG. 3 illustrates the equivalent electrical schematic of the cross-shaped sensor.

Referring now to FIG. 1, an exploded view of a single linear strip scroll sensor 10 is shown. Strip scroll sensor 10 includes spaced apart bottom and top substrates 12 and 14 which are held together at their edges with an adhesive spacer layer 16.

Bottom substrate 12 is a polymer such as PET but may also be a rigid or flexible circuit board. A fixed resistor 18 is deposited across a portion of the top surface of bottom substrate 12. Resistor 18 may be screen printed on the top surface of bottom substrate 12 using a carbon polymer thick film. Resistor 18 is printed such that the resistance per unit length is constant along the length of the resistor from one end of the resistor to the other end of the resistor. Two conductive drive traces 20 and 22 are printed on the top surface of bottom substrate 12 so as to electrically contact respective ends of resistor 18 and to extend out from the resistor to a tail region 24 of the bottom substrate. During use, electric potentials are applied to drive traces 20 and 22 to place the electric potentials across resistor 18.

A first set of fixed-potential spaced-apart conductive traces 26 are printed on the top surface of bottom substrate 12. The first set of traces 26 electrically contact resistor 18. Traces 26 extend outward from resistor 18 and are positioned at discrete points along the length of the resistor. When a voltage is applied to drive traces 20 and 22 and placed across resistor 18, each trace 26 is at an electric potential corresponding to the drive voltage and the position of the trace along the length of the resistor.

A second set of conductive spaced-apart traces 28 are printed on the top surface of bottom substrate 12 so as to be interleaved with the first set of traces 26. Traces 28 are electrically connected in common with one another and are electrically connected to a common trace 30. Common trace 30 is also printed on the top surface of bottom substrate 12 and extends out to tail region 24 of the bottom substrate. While strip scroll sensor 10 is in an untouched state (meaning that bottom and top substrates 12 and 14 are not pressed together) the two sets of traces 26 and 28 are not in electrical contact. It is noted that the traces could be printed of the same carbon ink as resistor 18, or could be printed of a more highly conductive silver or nickel/silver based polymer thick film ink.

Adhesive spacer layer 16 is placed around the perimeter of strip scroll sensor 10 and is interposed between the edges of bottom and top substrates 12 and 14. Spacer layer 16 is an adhesive that serves both to space the two substrates 12 and 14 apart and to hold strip scroll sensor 10 together. Spacer layer 16 preferably has a thickness between 0.002" and 0.013". Spacer layer 16 may be screen printed of a pressure sensitive adhesive, may be cut from a film pressure sensitive adhesive, or may be built up using any combination of materials that can both separate and adhere substrates 12 and 14 together.

Top substrate 14 is a flexible polymer sheet such as PET, polyimide, or any other film material. Top substrate 14 could be a slightly less flexible material such as polycarbonate, thin metal, or very thin circuit board material as long as it is sufficiently deformable to allow a reasonable force to push the top substrate against bottom substrate 12 in order to activate strip scroll sensor 10. The top surface of top substrate 14 could have a wear layer for protection or decoration. If transparent, this wear layer could be decorated on its inside surface with graphics. Alternatively, strip scroll sensor 10 could be covered with an actuator layer such as a metallized silicone keypad membrane typically used in a cell phone.

The bottom surface of top substrate 14 is coated with a conductive or partially conductive layer 32 such as a screen printed polymer thick film silver or carbon ink. Conductive layer 32 could alternatively be formed of a force sensitive resistor ink. When conductive layer 32 is pressed against and touches traces 26 and 28 on bottom substrate 12, a portion of the conductive layer electrically connects the second set of traces 28 and the touched first trace(s) together.

During measurement (for example, by a utilization circuit having a controller or other measurement system) an electric potential is placed across the ends of resistor 18 by applying the electric potential across drive traces 20 and 22. This causes a voltage drop across the length of resistor 18 such that the voltage at any location of the resistor is proportional to distance along the length of the resistor from one resistor end to the other resistor end. As such, each trace 26 carries an electric potential corresponding to the location of the resistor from which the trace is electrically connected. When first and second traces 26 and 28 are brought into electrical contact with one another via a current path up through conductive layer 32, traces 28 are raised to the electric potential that corresponds to the location of the touch. The utilization circuit then measures the voltage on common trace 30 (which is electrically connected to the second set of traces 28). The voltage measured on common trace 30 is indicative of the location of strip scroll sensor 10 being touched.

Strip scroll sensor 10 is linear in the sense that the resistance per unit length along resistor 18 is constant. Resistor 18 does not need to be geometrically straight. For example, resistor 18 could be an arc, a serpentine path, end to end attached linear segments, etc.

Bottom substrate 12 could be a flexible material such as polyester, polyimide, etc. In the case of polyester or other relatively low temperature flexible polymer film, the conductive traces on the top surface of bottom substrate 12 could be screen printed from silver polymer thick film ink. In the case of polyimide, the flexible polymer typically used in the flexible circuit industry, the conductive traces could be etched out of a very thin copper layer bonded to bottom substrate 12. Alternatively, bottom substrate 12 could be built out of phenolic, FR4, or other traditional rigid circuit board. In this case, the conductive traces could be etched from the copper layer bonded to that board. Copper conductive traces may be tinned or gold plated to prevent oxidation.

In the case of a rigid board substrate, the rigid board may have plated through holes at its edges that have been sliced in half in order to form castellations. These castellations are points that may be soldered to a host circuit board. Alternatively, the conductive traces may be formed directly on the same circuit board that contains the utilization circuit.

Top substrate 14 and adhesive spacer layer 16, if formed of materials that cannot withstand high temperature, could be adhered directly to bottom substrate 12 after the bottom substrate components have been assembled in a high temperature solder reflow process. If top substrate 14 and adhesive spacer layer 16 are formed of high temperature materials such as polyimide then they could be adhered to bottom substrate 12 before solder reflow, and may be subjected to solder reflow with other components.

Whether built on a rigid or flexible substrate, several methods are available for connecting strip scroll sensor 10 to the utilization circuit. One way is to configure tail region 24 of bottom substrate 12 such that it may be inserted into a connector on the utilization circuit. Another way, as mentioned above, is to create strip scroll sensor 10 with edge castellations that are points where the sensor may be soldered directly to the utilization circuit board.

The present invention provides a touch input device having multiple scroll sensors (such as two or more strip scroll sensors 10) interleaved with one another in such a way as to allow smooth operation and transition between the multiple scroll sensors. Interleaved scroll sensors are constructed and used in much the same way as simple linear strip scroll sensors with the addition of a center interaction zone and a method of measuring the center interaction zone.

In accordance with the present invention, interleaved scroll sensors include like elements as described for strip scroll sensor 10. That is, the interleaved scroll sensors include a bottom substrate having conductive elements and resistive elements, an adhesive spacer layer, and a top substrate having a conductive or resistive coating layer for shorting the conductive elements of the bottom substrate. The interleaved scroll sensors may be constructed in accordance with the construction options described for strip scroll sensor 10.

Figures 2A, 2B, 2C:
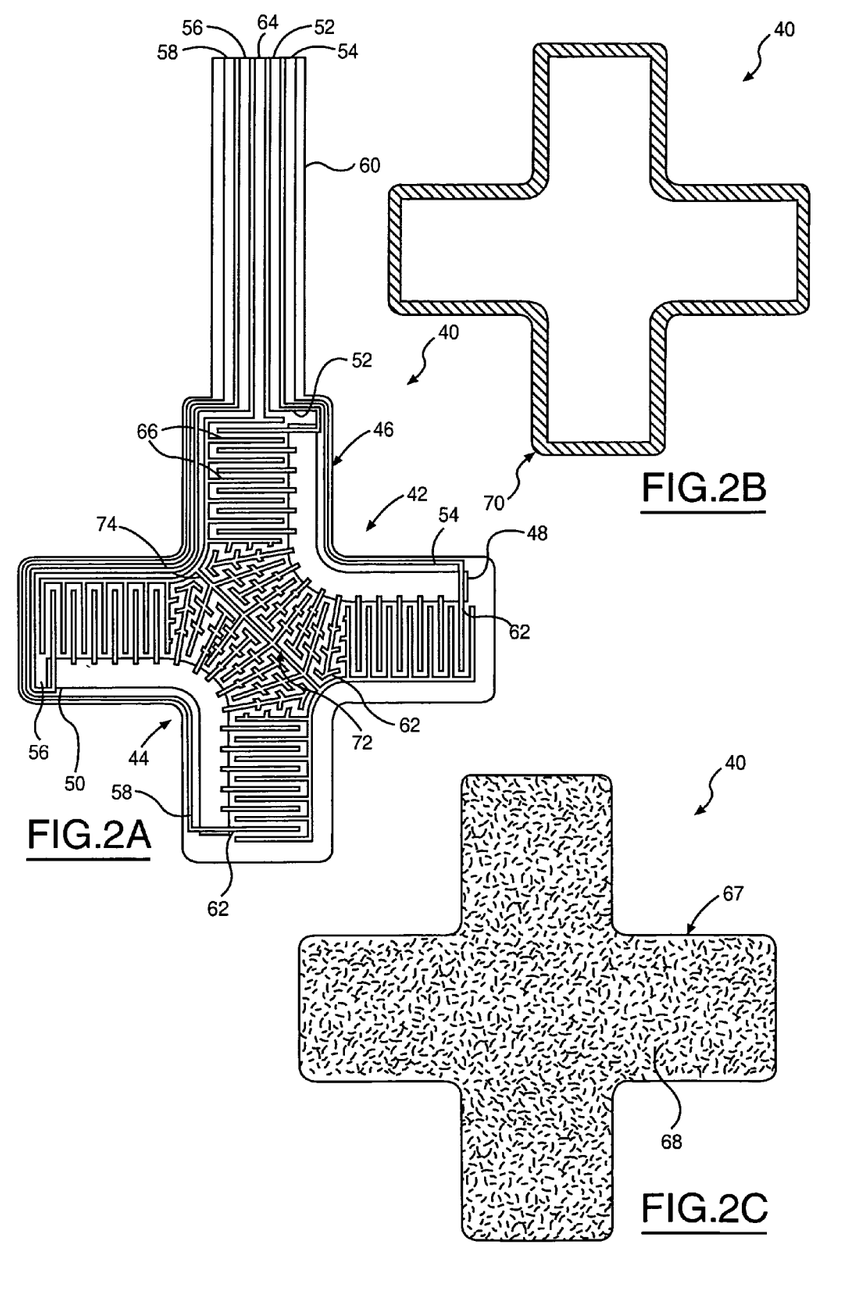
FIG. 2A illustrates the bottom substrate of a cross-shaped sensor having interleaved strip scroll sensors in accordance with the present invention.
FIG. 2B illustrates the spacer layer of the cross-shaped sensor.
FIG. 2C illustrates the top substrate of the cross-shaped sensor.

Referring now to FIGS. 2A, 2B and 2C, with continual reference to FIG. 1, the bottom and top substrates and the spacer layer of a cross-shaped sensor 40 in accordance with the present invention are shown. With specific reference to FIG. 2A, cross-shaped sensor 40 includes two interleaved linear strip scroll sensors 42 and 44. Two fixed resistors 48 and 50 are printed on the top surface of bottom substrate 46. Resistor 48 is part of strip scroll sensor 42 and resistor 50 is part of strip scroll sensor 44. Resistor 48 forms a right angle and extends through two arms (i.e., the "north" and "east" arms) of cross-shaped sensor 40. Resistor 50 also forms a right angle and extends through the two other arms (i.e., the "south" and "west" arms) of cross-shaped sensor 40.

Cross-shaped sensor 40 includes three types of conductive traces printed on the top surface of bottom substrate 46. The three conductive trace types include: drive lines, fixed-potential fingers, and a sense line which has a set of electrically contiguous traces. Drive lines 52 and 54 are electrically connected to respective ends of resistor 48. Similarly, drive lines 56 and 58 are electrically connected to respective ends of resistor 50. As such, there are four drive lines 52, 54, 56, and 58. Drive line 52, 54, 56, and 58 extend away from the ends of resistors 48 and 50 out to a tail region 60 of bottom substrate 46 for connection to a utilization circuit.

Individual fixed-potential fingers 62 are electrically connected to and extend from resistors 48 and 50 at discrete points along the lengths of the resistors. Fingers 62 are spaced-apart conductive fingers that, when an electric potential is applied to the drive lines and placed across resistors 48 and 50, carry a fixed electric potential. Each finger 62 carries a fixed electric potential corresponding to the drive voltage placed across the resistor from which it extends and its position along the length of the resistor from which it extends.

An electrically contiguous set of conductive traces 66 are interdigitated with fingers 62. Traces 66 are connected in common to a sense line 64. Sense line 64 extends out to tail region 60 of bottom substrate 46 for connection to the utilization circuit. As such, sense line 64 is a single contiguous line that snakes among all of the fixed-potential fingers 62 and extends out to tail region 60.

As with top substrate 14 of strip scroll sensor 10, top substrate 67 (shown in FIG. 2C) of cross-shaped sensor 40 includes a conductive or resistive coating 68 on its bottom surface. Top substrate 67 is spaced apart from and adhered to bottom substrate 46 by an adhesive spacer layer 70 (shown in FIG. 2C) placed around the perimeter of cross-shaped sensor 40.

Resistors 48 and 50; drive lines 52, 54, 56, and 58; and sense line 64 are arranged to obviate the need for multiple circuit layers or crossovers. Other orderings of the drive and sense lines are possible but may require additional manufacturing steps such as printing dielectric over a trace so that it may be traversed but not electrically contacted by a second trace.

A center interaction zone 72 is formed near the center of cross-shaped sensor 40. In center interaction zone 72, fixed-potential fingers 62 extend from one of resistors 48 and 50 towards the other resistor. In center interaction zone 72, the two sets of fixed-potential fingers 62 (a first set of fingers 62 electrically connected to resistor 48 and a second set of fingers 62 electrically connected to resistor 50) are interleaved with traces 66 of a sense line portion 74 running through the center interaction zone. That is, in center interaction zone 72, the first set of fingers 62 extending from resistor 48 towards resistor 50 are interleaved with traces 66 extending from sense line portion 74 towards resistor 48. Likewise, in center interaction zone 72, the second set of fingers 62 extending from resistor 50 towards resistor 48 are interleaved with traces 66 extending from sense line portion 74 towards resistor 50. As such, in central interaction zone 72, two sets of fixed-potential fingers 62 emanate from resistors 48 and 50 towards the other resistor, with both sets of fingers 62 being interleaved with the same sense line portion 74.

Referring now to FIG. 3, with continual reference to FIGS. 2A, 2B, and 2C, the equivalent electrical schematic of cross-shaped sensor 40 is shown. As described with reference to FIGS. 2A, 2B, and 2C, cross-shaped sensor 40 is a touch sensor made up of two linear potentiometers 48 and 50 (i.e., resistors 48 and 50) which can be electrically connected together via a common sense line 64. Cross-shaped sensor 40 is unique in that each potentiometer 48 and 50 forms an "L" shape and measures a piece of both the X and Y axes. This configuration is optimal as it allows smooth motion through center interaction zone 72 as well as the use of a single voltage sense line 64 to measure the output from both potentiometers 48 and 50.

Figure 4:
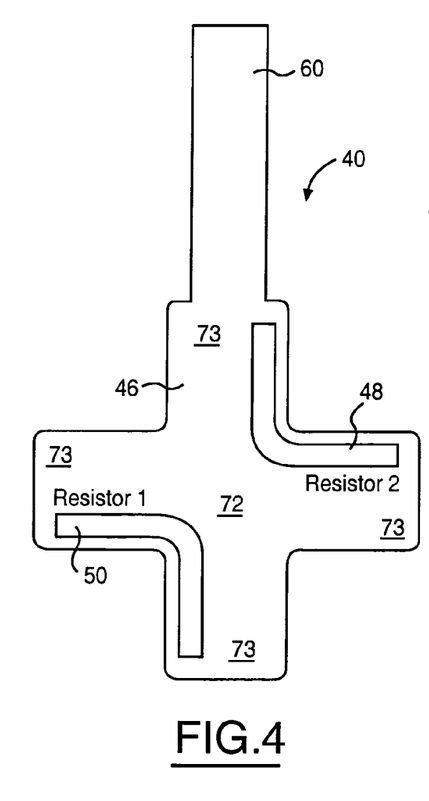
FIG. 4 illustrates the actual positions of the two resistors of the cross-shaped sensor.
Figure 5:
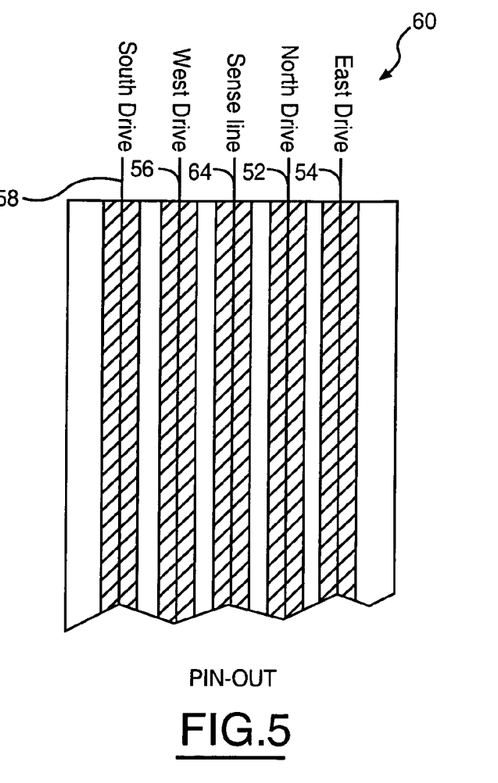
FIG. 5 illustrates the pin-out of the tail region of the cross-shaped sensor.

FIG. 4 illustrates the actual positions of potentiometers 48 and 50 on the top surface of bottom substrate 46 in cross-shaped sensor 40. Potentiometers 48 and 50 extend at right-angles through respective arms 73 of cross-shaped sensor 40. FIG. 5 illustrates the pin-out of tail region 60 of cross-shaped sensor 40. Drive lines 52, 54, 56, and 58 and sense line 64 extend along tail region 60.

Figure 9:
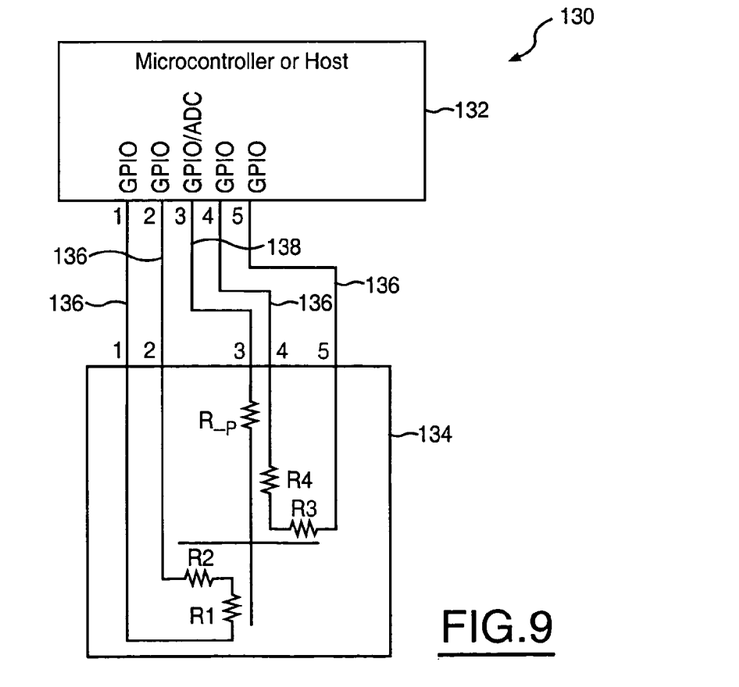
FIG. 9 illustrates an example circuit for the measurement of an interleaved scroll sensor in accordance with the present invention.

FIG. 9 illustrates an example circuit 130 for the measurement of an interleaved scroll sensor 134 such as cross-shaped sensor 40. Circuit 130 includes a micro-controller 132 which has four general purpose input/output (GPIO) lines 136 and an A/D (analog-to-digital) converter 138. GPIO lines 136 can be configured as output high, output low, or high impedance inputs. As a high impedance input, a GPIO line 136 is effectively disconnected from sensor 134.

As such, cross-shaped sensor 40 requires four general-purpose I/O drive line pins and one A/D (analog-to-digital) converter for its measurement. The drive line pins apply voltages to drive lines 52, 54, 56, and 58 in order to apply voltages across resistors 48 and 50. The A/D converter measures the voltage on sense line 64 when the sense line is connected to the rest of the circuit upon cross-shaped sensor 40 being touched. Switches 69 shown in the electrical schematic of FIG. 3 represent sense line 64 being disconnected from the rest of the circuit when cross-shaped sensor 40 is not being touched. Touching cross-shaped sensor 40 connects sense line 64 with fixed potential fingers 62 effectively closing one or both of switches 69, depending upon the location of the touch.

When cross-shaped sensor 40 is touched, the A/D converter reads the voltage on sense line 64 to determine where the touch occurred. A touch applied to cross-shaped sensor 40 can result in one of potentiometers 48 and 50 becoming active when the touch occurs in one of arms 73, or can result in both potentiometers becoming active when the touch occurs in center interactive zone 72. The X and Y axes values are obtained for each potentiometer 48 and 50 using a lookup table. In the case of both potentiometers 48 and 50 becoming active, the readings are averaged together using a weighted averaging function.

Once the location of the touch is found, it is mapped onto either the X axis or the Y axis. When the touch passes through center interactive zone 72, readings are generated on both the X and Y axes. Because one of these readings is unwanted, an axis-locking feature is implemented in accordance with the present invention. The output is restricted (i.e., locked) to the axis of the first touch until sufficient activity on the other axis is detected. Generally, the axis that has the most activity will be controlling.

Figure 6:
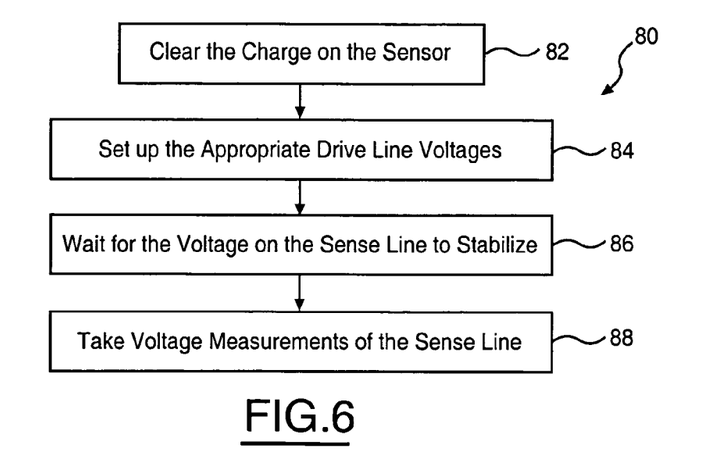
FIG. 6 illustrates a flow chart describing the measurement process for obtaining the position of a touch on the cross-shaped sensor in accordance with the present invention.

Referring now to FIG. 6, a flow chart 80 describing the measurement process for obtaining the position of a touch on cross-shaped sensor 40 in accordance with the present invention is shown. The measurement process generally includes six individual measurements which are taken to give the position of a touch on cross-shaped sensor 40. The procedure for taking each of these six measurements will be described in the context of the measurement process.

The measurement process initially includes clearing the charge on cross-shaped sensor 40 as shown by block 82. In this step, all five lines (the four drive lines 52, 54, 56, and 58; and sense line 64) are enabled as outputs and are set to 0 volts. The measurement process then includes setting up the appropriate drive line voltages as shown by block 84. In this step, sense line 64 is configured as an A/D converter input; and drive lines 52, 54, 56, and 58 are appropriately configured as either an output high (+Vcc), an output low (0 volts), or a Hi-Z (high impedance) state. The measurement process then includes waiting for the voltage on sense line 64 to stabilize as shown by block 86. In this step, the voltage generated on sense line 64 can have an input resistance ranging from 2 k to 100 k Ohms. Higher resistance results from very light pressure on cross-shaped sensor 40. A typical measurement taken on a Microchip PIC16F73 micro-processor with a 20 kOhm input resistance has a time constant of approximately one microsecond. Allowing five to ten microseconds before taking a voltage measurement of sense line 64 assists in increasing the sensitivity of cross-shaped sensor 40 and the ability to detect light touches on the cross-shaped sensor.

The measurement process then includes taking the six voltage measurements of sense line 64 as shown in block 88. The six voltage measurements (#1-#6) are listed in the following table:

|     | South (58) | West (56) | Sense (64) | North (52) | East (54) |
| --- | --- | --- | --- | --- | --- |
| # 1 | +Vcc | 0 V | A/D input | Hi-Z | Hi-Z |
| # 2 | 0 V | +Vcc | A/D input | Hi-Z | Hi-Z |
| # 3 | Hi-Z | Hi-Z | A/D input | +Vcc | 0 V |
| # 4 | Hi-Z | Hi-Z | A/D input | 0 V | +Vcc |
| # 5 | 0 V | 0 V | A/D input | +Vcc | +Vcc |
| # 6 | +Vcc | +Vcc | A/D input | 0 V | 0 V |

Measurements #1, #2; measurements #3, #4; and measurements #5, #6 are complements of one another, respectively. Measuring the complemented pairs serves two purposes. First, measuring in pairs of measurements allows spurious or partial touch samples to be ignored. If, for example, a user stops touching cross-shaped sensor 40 after measurement #3 but before measurement #4, then this pair of measurements would not add up to 255 (using an 8-bit ADC) and the measurement could be ignored. A second purpose for measuring in pairs of measurements is to improve the accuracy and smoothness of the data.

Measurements #1 and #2 are both taken from the west and south arms 73 of cross-shaped sensor 40. During these measurements, the north and east arms 73 of cross-shaped sensor 40 are set to high impedance (Hi-Z) to effectively disconnect them from the circuit. Measurements #3 and #4 are both associated with the north and east arms 73 of cross-shaped sensor 40. During these measurements, the west and south arms 73 of cross-shaped sensor 40 are set to high impedance to effectively disconnect them from the circuit. Measurements #5 and #6 involve all four arms 73 of cross-shaped sensor 40. These measurements are used to create a smooth motion through center interactive zone 72.

The procedure for processing the measurement data in accordance with the present invention will now be described. The following discussion assumes an 8-bit ADC. For a 10-bit ADC, the "255" value is to be replaced with the "1024".

Processing Measurements #1, #2, #3, and #4

When a touch occurs on any portion of cross-shaped sensor 40, sense line 64 generates a voltage corresponding to the distance along the length of either resistor 48 or 50. When this occurs the resistor 48 or 50 is said to be "active." If cross-shaped sensor 40 is touched in a place that activates resistor 50 (i.e., resistor1), then measurements #1 and #2 will add to 255 plus or minus 10. If cross-shaped sensor 40 is not touched or is touched too lightly, the input resistance to the A/D converter will be too high and the statement will be false. Measurement #1 and the complement of measurement #2 are averaged together to give the final value of voltage from resistor 50. Only if resistor 50 is found to be active will its value be used. In the case of resistor 48 (i.e., resistor2), measurements #3 and the complement of measurement #4 are used in the same fashion to determine if resistor 48 is active. An example of code written in C is provided below.

```
//average the two measurements to get the value
resistor1_voltage = (measurement1 + 255 – measurement2)/2;
//check if resistor1 is active
if(abs(measurement1 + measurement2 – 255) > 10)
  resistor1_active_flag = 0;
else
  resistor1_active_flag = 1;
//average the two measurements to get the value
resistor2_voltage = (measurement3 + 255 – measurement4)/2;
//check if resistor2 is active
if(abs(measurement3 + measurement4 – 255) > 10)
  resistor2_active_flag = 0;
else
  resistor2_active_flag = 1;
```

Once the voltage from either resistor 48 or 50 is known, it can be used in the lookup table to give the X and Y axes values for the point of touch. Because resistors 48 and 50 are symmetric and the origin of both axes is in center interactive zone 72 of cross-shaped sensor 40, only one lookup table is needed. The X and Y axes values obtained for resistor 50 are simply negated to give the proper position of the west and south arms 73 of cross-shaped sensor 40. In practice, the lookup code is combined with the weighted averaging code and is described below in the following discussion regarding the processing of measurements #5 and #6.

Processing Measurements #5 and #6

A touch in center interactive zone 72 where both resistors 48 and 50 become active at the same time will give valid X and Y axes values from the lookup table for both of the resistors. Simply averaging the values from the two resistors 48 and 50 produces a "jump" or discontinuity in the path of the output. To fix this problem, measurements #5 and #6 can give an indication of what fraction of a touch belongs to each of the resistor arms. This information is used in a weighted averaging scheme that results in smooth transitions through center interactive zone 72.

Measurements #5 and #6 are taken along the diagonal of cross-shaped sensor 40, where one entire resistor is set to +Vcc and the other entire resistor is set to 0 volts. The average from these two complemented measurements is calculated in the same manner as the other measurements (an example of code written in C being provided below):

```
//average the two readings diagonal_voltage=(measurement5+255−measurement6)/2;
```

The diagonal_voltage gives an indication of how much each resistor 48 and 50 is touched. When only one resistor is active, diagonal_voltage is pulled to either 0 or 255. If the user touches exactly between the two resistors 48 and 50, diagonal_voltage will be 127 or 128. Likewise, any combination of the two touches results in a number that scales linearly from 0 to 255.

The diagonal_voltage is used in a weighted averaging algorithm in order to ensure a smooth transition through center interactive zone 72. A weighted average of two numbers is as follows:

$$x=(ax_1+bx_2)/(a+b)$$

Where $x_1$ and $x_2$ are two numbers to be averaged and a and b are their respective weights. In the present algorithm, a is set to 0x80*diagonal_voltage and b is set to 0x7FFF−0x80*diagonal_voltage. This scheme uses binary fixed-point arithmetic (described in greater detail below) so that the denominator in the above expression is equivalent to one and no division is required.

The following code describes the averaging algorithm used for calculating the X and Y axes values. Combined within this code are the x and y look-ups from the two following look-up tables. (The two look-up tables are followed by the averaging algorithm code.)

| const unsigned char x_lookup[ ]= { | | | | | |
|---|---|---|---|---|---|
| {127}, | {82}, | {38}, | {3}, | {0}, | {0}, |
| {126}, | {81}, | {37}, | {3}, | {0}, | {0}, |
| {125}, | {80}, | {36}, | {3}, | {0}, | {0}, |
| {124}, | {79}, | {35}, | {2}, | {0}, | {0}, |
| {123}, | {78}, | {34}, | {2}, | {0}, | {0}, |
| {122}, | {77}, | {33}, | {2}, | {0}, | {0}, |
| {121}, | {77}, | {32}, | {1}, | {0}, | {0}, |
| {120}, | {76}, | {31}, | {1}, | {0}, | {0}, |
| {119}, | {75}, | {30}, | {1}, | {0}, | {0}, |
| {118}, | {74}, | {30}, | {1}, | {0}, | {0}, |
| {117}, | {73}, | {29}, | {0}, | {0}, | {0}, |
| {116}, | {72}, | {28}, | {0}, | {0}, | {0}, |
| {115}, | {71}, | {27}, | {0}, | {0}, | {0}, |
| {114}, | {70}, | {26}, | {0}, | {0}, | {0}, |
| {114}, | {69}, | {25}, | {0}, | {0}, | {0}, |
| {113}, | {68}, | {24}, | {0}, | {0}, | {0}, |
| {112}, | {67}, | {24}, | {0}, | {0}, | }; |
| {111}, | {66}, | {23}, | {0}, | {0}, | |
| {110}, | {65}, | {22}, | {0}, | {0}, | |
| {109}, | {65}, | {21}, | {0}, | {0}, | |
| {108}, | {64}, | {20}, | {0}, | {0}, | |
| {107}, | {63}, | {19}, | {0}, | {0}, | |
| {106}, | {62}, | {19}, | {0}, | {0}, | |
| {105}, | {61}, | {18}, | {0}, | {0}, | |
| {104}, | {60}, | {17}, | {0}, | {0}, | |
| {103}, | {59}, | {16}, | {0}, | {0}, | |
| {102}, | {58}, | {16}, | {0}, | {0}, | |
| {102}, | {57}, | {15}, | {0}, | {0}, | |

| -continued | | | | |
|---|---|---|---|---|
| {101}, | {56}, | {14}, | {0}, | {0}, |
| {100}, | {55}, | {14}, | {0}, | {0}, |
| {99}, | {54}, | {13}, | {0}, | {0}, |
| {98}, | {53}, | {12}, | {0}, | {0}, |
| {97}, | {53}, | {12}, | {0}, | {0}, |
| {96}, | {52}, | {11}, | {0}, | {0}, |
| {95}, | {51}, | {10}, | {0}, | {0}, |
| {94}, | {50}, | {10}, | {0}, | {0}, |
| {93}, | {49}, | {9}, | {0}, | {0}, |
| {92}, | {48}, | {9}, | {0}, | {0}, |
| {91}, | {47}, | {8}, | {0}, | {0}, |
| {90}, | {46}, | {7}, | {0}, | {0}, |
| {90}, | {45}, | {7}, | {0}, | {0}, |
| {89}, | {44}, | {6}, | {0}, | {0}, |
| {88}, | {43}, | {6}, | {0}, | {0}, |
| {87}, | {42}, | {5}, | {0}, | {0}, |
| {86}, | {41}, | {5}, | {0}, | {0}, |
| {85}, | {40}, | {4}, | {0}, | {0}, |
| {84}, | {40}, | {4}, | {0}, | {0}, |
| {83}, | {39}, | {4}, | {0}, | {0}, |

| const unsigned char y_lookup [ ] = { | | | | | |
|---|---|---|---|---|---|
| {0}, | {0}, | {0}, | {24}, | {68}, | {113}, |
| {0}, | {0}, | {0}, | {25}, | {69}, | {114}, |
| {0}, | {0}, | {0}, | {26}, | {70}, | {114}, |
| {0}, | {0}, | {0}, | {27}, | {71}, | {115}, |
| {0}, | {0}, | {0}, | {28}, | {72}, | {116}, |
| {0}, | {0}, | {0}, | {29}, | {73}, | {117}, |
| {0}, | {0}, | {1}, | {30}, | {74}, | {118}, |
| {0}, | {0}, | {1}, | {30}, | {75}, | {119}, |
| {0}, | {0}, | {1}, | {31}, | {76}, | {120}, |
| {0}, | {0}, | {1}, | {32}, | {77}, | {121}, |
| {0}, | {0}, | {2}, | {33}, | {77}, | {122}, |
| {0}, | {0}, | {2}, | {34}, | {78}, | {123}, |
| {0}, | {0}, | {2}, | {35}, | {79}, | {124}, |
| {0}, | {0}, | {3}, | {36}, | {80}, | {125}, |
| {0}, | {0}, | {3}, | {37}, | {81}, | {126}, |
| {0}, | {0}, | {3}, | {38}, | {82}, | {127}, |
| {0}, | {0}, | {4}, | {39}, | {83}, | }; |
| {0}, | {0}, | {4}, | {40}, | {84}, | |
| {0}, | {0}, | {4}, | {40}, | {85}, | |
| {0}, | {0}, | {5}, | {41}, | {86}, | |
| {0}, | {0}, | {5}, | {42}, | {87}, | |
| {0}, | {0}, | {6}, | {43}, | {88}, | |
| {0}, | {0}, | {6}, | {44}, | {89}, | |
| {0}, | {0}, | {7}, | {45}, | {90}, | |
| {0}, | {0}, | {7}, | {46}, | {90}, | |
| {0}, | {0}, | {8}, | {47}, | {91}, | |
| {0}, | {0}, | {9}, | {48}, | {92}, | |
| {0}, | {0}, | {9}, | {49}, | {93}, | |
| {0}, | {0}, | {10}, | {50}, | {94}, | |
| {0}, | {0}, | {10}, | {51}, | {95}, | |
| {0}, | {0}, | {11}, | {52}, | {96}, | |
| {0}, | {0}, | {12}, | {53}, | {97}, | |
| {0}, | {0}, | {12}, | {53}, | {98}, | |
| {0}, | {0}, | {13}, | {54}, | {99}, | |
| {0}, | {0}, | {14}, | {55}, | {100}, | |
| {0}, | {0}, | {14}, | {56}, | {101}, | |
| {0}, | {0}, | {15}, | {57}, | {102}, | |
| {0}, | {0}, | {16}, | {58}, | {102}, | |
| {0}, | {0}, | {16}, | {59}, | {103}, | |
| {0}, | {0}, | {17}, | {60}, | {104}, | |
| {0}, | {0}, | {18}, | {61}, | {105}, | |
| {0}, | {0}, | {19}, | {62}, | {106}, | |
| {0}, | {0}, | {19}, | {63}, | {107}, | |
| {0}, | {0}, | {20}, | {64}, | {108}, | |
| {0}, | {0}, | {21}, | {65}, | {109}, | |
| {0}, | {0}, | {22}, | {65}, | {110}, | |
| {0}, | {0}, | {23}, | {66}, | {111}, | |
| {0}, | {0}, | {24}, | {67}, | {112}, | |

```
//Do a weighted average of the Y-values from resistor1 and resistor2.
//Typecast the final answer to 8-bit character value
y = (char) (fract_mul(128*diagonal_value, y_lookup[resistor2_voltage])
    //The first multiplicand is the weighting factor, and the second is
    //the y-value from the lookup table for resistor2. Multiplying
    //by 128 will scale the 8-bit (0 - 255) char into a 16-bit
    (0-32768) int.
  - fract_mul((0x7fff - 128*diagonal_value),
    y_lookup[resistor1_voltage]));
    //The first multiplicand is the complement of the first
    //weighting factor. When the first weighting factor is large,
    //this value will be small. The second argument is the y-value
    //from the lookup table for resistor1. This second term
    //is negative to reflect the opposite orientation of resistor1.
//Treat the X-values the same:
x = (char)(fract_mul(128*diagonal_voltage,
  x_lookup[resistor2_voltage])
  - fract_mul((0x7fff - 128*diagonal_voltage),
  x_lookup[resistor1_voltage]));
```

The first argument in each fract_mul(int, int) function is the scaling factor. The expression 128*diagonal_value is a number between 0 and 1. The expression (0x7fff−128*diagonal_value) is also a number between 0 and 1. These two expressions are complements of each other so that when one expression is close to 1, the other expression is close to 0. The second argument in each fract_mul(int, int) function is the X or Y axis value from each resistor. Because the origin is in the middle (i.e., center interaction zone 72) of cross-shaped sensor 40, all the measurements from resistor 50 are negative. This is taken into account by subtracting the values produced by resistor 50 from the values produced by resistor 48.

Binary Fixed-Point Arithmetic

As indicated above, the algorithm for determining the weighted average ("x") during the procedure for processing measurements #5 and #6 includes using binary fixed-point arithmetic so that the denominator ("a+b") in the weighted average expression ("x=(ax$_1$+bx$_2$)/(a+b)") is equivalent to one and no division is required. Recall that x$_1$ and x$_2$ are two numbers to be averaged and a and b are their respective weights; and that in this algorithm, a is set to 0x80*diagonal_voltage and b is set to 0x7FFF-0x80*diagonal_voltage.

Because of its high ROM, RAM, and CPU time requirements, floating-point arithmetic is expensive to implement in small micro-controllers. It is therefore usually desirable to use integer arithmetic. However, fractional values are often encountered. For example, it may be necessary to scale 8-bit sensor measurements so that full-scale output goes between 0 and 100. In this case, every measurement must be multiplied by a scale factor of 0.392. The question is how can this be done with integers?

The answer is "Binary Fixed-Point Arithmetic." All numbers are represented as signed integers with an implied decimal point at the far left. This means that all numbers are actually less than 1. In this number system, the hex values between 0x0000 and 0x7FFF represent fractions between 0.000 and 1.000. The hex values between 0x8000 and 0xFFFF represent fractions between negative 1.000 and 0.000.

Multiplication in this number system is only slightly more complicated than for regular integers. It works as follows:

1. Multiply the two two-byte integers together and get a four-byte result.

2. Multiply the four-byte result by two. This shifts the imaginary decimal back into the correct position.

3. Take the two high bytes as the final result. Round up if necessary.

This can be accomplished in a C-language function; the function is called fractional_multiply(int A, int B) or fract_mul(int A, int B).

Binary fixed-point math works well for sensors because the measured data has a clearly defined maximum value. For example, if all data arises from 8 bit A/D converter measurements, then the maximum value is 0xFF. If every measurement is multiplied by 0x80, or 128, the maximum value becomes 0x7FFF. Common operations such as scaling measurements for output are then simple to perform. Take the problem stated above, where it is desired to scale all outputs to be between 0 and 100 by multiplying every measurement by 0.392. This fraction has to be represented in the new number system. To do this, multiply 0.392 by 32767 (0x7FFF), so that 0.392=0x322D. To scale the output, call the multiply function: Output=fractional_multiply(measurement, 0x322D). The maximum possible value is then 0x0064 or 100. The method of binary fixed-point math is also useful for smoothing data.

An algorithm for the axis locking feature in accordance with the present invention will now be described. There can only be one point of touch reported by cross-shaped sensor 40 at any given time. Therefore only one axis may report a value and the other axis must be ignored. When cross-shaped sensor is touched in center interaction zone 72, a value for both axes will be obtained. It is necessary to choose only one axis to report and the other axis is ignored. The axis to report is initially chosen to be the axis with the largest displacement from center interactive zone 72. The reported output position will switch axes only when the deviation from the center of the other axis is greater than both the current axis and a minimum threshold. This threshold value is used to determine when to lock onto the other axis and is set small so that an intentional change in axis produces only a slight discontinuity. An example of the axis locking code is as follows.

```
void axis_lock_calc( )
{
  #define DIST_LOCK_THRESHOLD 15
  unsigned char x_mag = 0, y_mag = 0; //magnitude of each axis
  //first catch the inactive state and reset the state machine
  if(resistor1_active_flag == 0 && resistor2_active_flag == 0)
  {
    axis_lock_state = 0;
  }
  //find magnitudes so they are always positive values
  if(x < 0)
    x_mag = -x;
  else
    x_mag = x;
  if(y_ave < 0)
    | y_mag = -y;
  else
    y_mag = y;
  switch(axis_lock_state)
  {
//---------------------------------------------------------------
//State 0:   No touch yet, both axes off. Looking for a resistor to become
active.
//    If a resistor is active, find the largest value and lock to it.
    case 0:
      if(resistor1_active_flag || resistor2_active_flag)
      {
        if(x_mag >= y_mag)
        {
          x_axis_flag = 1;   //x axis on, y axis off
          y_axis_flag = 0;
          axis_lock_state = 1;   //lock to x axis
```

-continued

```
        }
        else
        {
            y_axis_flag = 1;    //y axis on, x axis off
            x_axis_flag = 0;
            axis_lock_state = 2;    //lock to y axis
        }
    }
    else    //both resistors are inactive
    {
        x_axis_flag = 0;
        y_axis_flag = 0;
    }
    break;
//-----------------------------------------------------------
//State 1:  Locked to X-axis. Until the y magnitude is both greater than
//      the threshold and the x-axis magnitude, only display the x-axis.
    case 1:
        if(y_mag > DIST_LOCK_THRESHOLD && y_mag > x_mag)
        {
            y_axis_flag = 1,
            x_axis_flag = 0;
            axis_lock_state = 2; //lock to y axis
        }
        else
        {
            x_axis_flag = 1;
            y_axis_flag = 0;
        }
        break;
//-----------------------------------------------------------
//State 2:  Locked to Y-axis. Until the x magnitude is both greater
//      than the threshold and the y-axis magnitude, only display
//      the y-axis.
    case 2:
        if(x_mag > DIST_LOCK_THRESHOLD && x_mag > y_mag)
        {
            x_axis_flag = 1;
            y_axis_flag = 0;
            axis_lock_state = 1; //lock to x axis
        }
        else
        {
            y_axis_flag = 1;
            x_axis_flag = 0;
        }
        break;
    }//end of switch( )
}//***************End of Axis Locking
Code**************************
```

Figure 7:
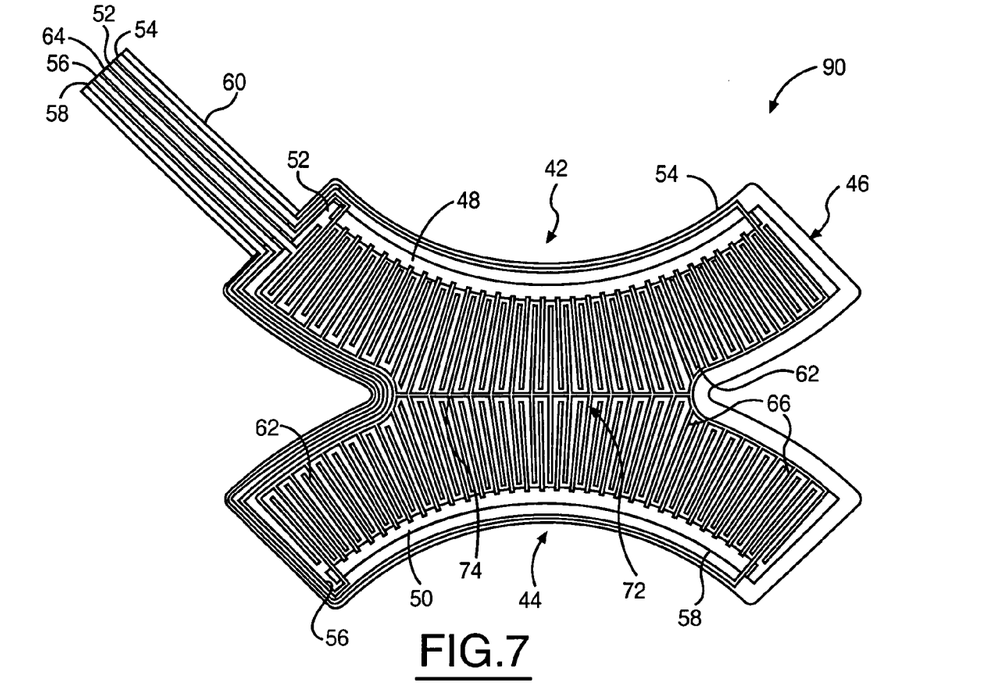
FIG. 7 illustrates the bottom substrate of a dual arc-shaped sensor having interleaved strip scroll sensors in accordance with the present invention.

Referring now to FIG. 7, the bottom substrate of a dual arc-shaped sensor 90 in accordance with the present invention is shown. Dual-arc shaped sensor 90 includes two interleaved linear strip scroll sensors 42 and 44. Resistors 48 and 50 are printed on the top surface of bottom substrate 46. Resistor 48 is arc-shaped and is part of strip scroll sensor 42. Resistor 50 is arc-shaped and is part of strip scroll sensor 44.

As with cross-shaped sensor 40, dual arc-shaped sensor 90 includes the three types of conductive traces printed on the top surface of bottom substrate 46. These conductive traces include: drive lines 52, 54, 56, and 58; fixed-potential fingers 62; and a sense line 64 having an electrically contiguous set of traces 66. Drive lines 52 and 54 are electrically connected to respective ends of resistor 48; and drive lines 56 and 58 are electrically connected to respective ends of resistor 50.

Fingers 62 are electrically connected to and extend from resistors 48 and 50. The electrically contiguous traces 66 of sense line 64 are interdigitated with fingers 62. As such, sense line 64 is a single contiguous line that snakes among the fixed-potential fingers 62. As with the top substrates of strip scroll sensor 10 and cross-shaped sensor 40, the top substrate (not shown) of dual arc-shaped sensor 90 includes a conductive or resistive coating on its bottom surface. The top substrate is spaced apart from and adhered to bottom substrate 46 of dual arc-shaped sensor 90 by an adhesive spacer layer (not shown).

Center interaction zone 72 is formed near the center of dual arc-shaped sensor 90. Center interaction zone 72 (i.e., the interaction region) has fingers 62 emanating from each resistor 48 and 50 towards the other resistor. These fingers are interleaved with traces 66 extending from sense line portion 74 running through the middle of center interaction zone 72.

Figure 8:
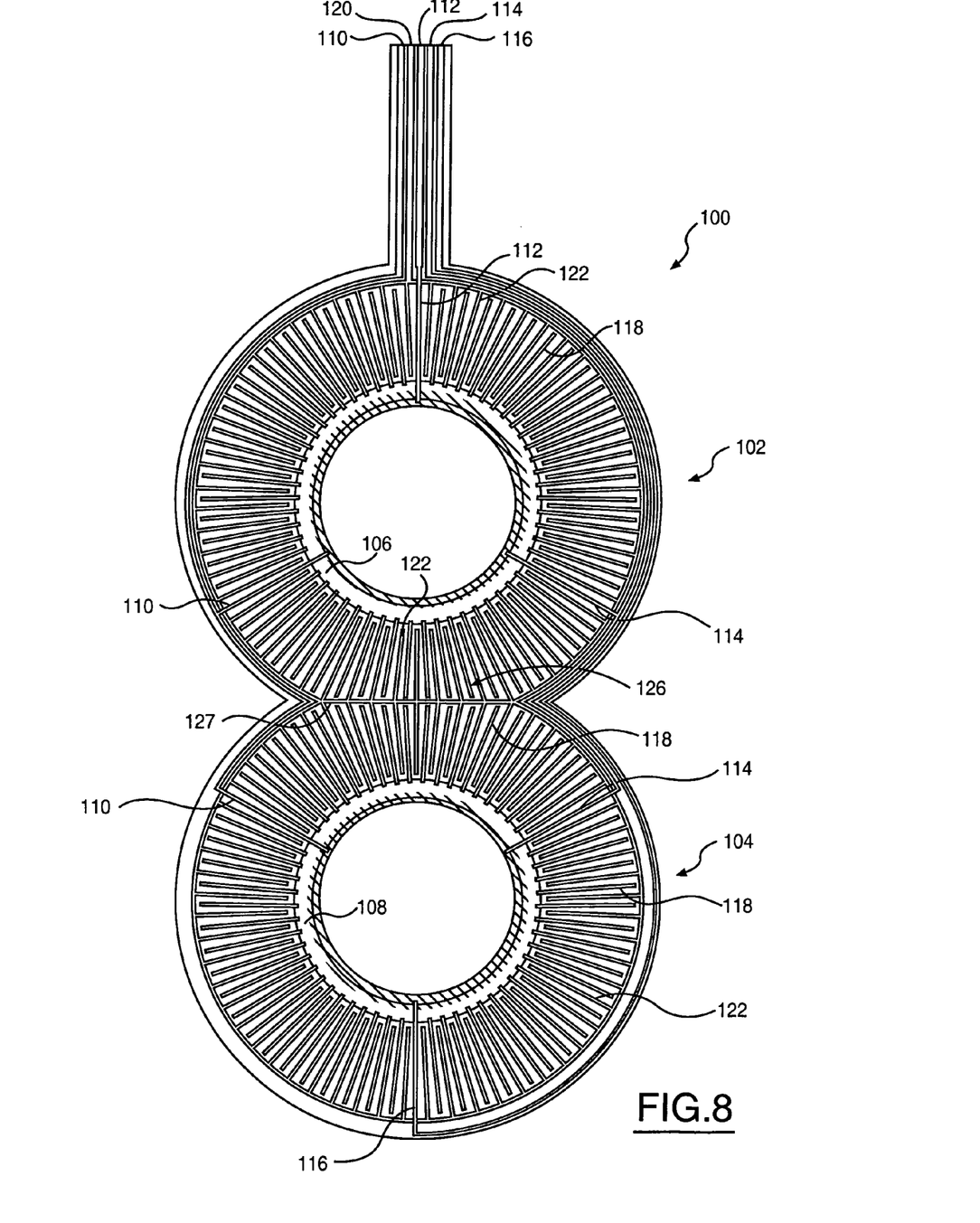
FIG. 8 illustrates the bottom substrate of a dual circular-shaped sensor having interleaved ring scroll sensors in accordance with the present invention.

Referring now to FIG. 8, the bottom substrate of a dual circular-shaped sensor 100 in accordance with the present invention is shown. Dual circular-shaped sensor 100 includes two interleaved ring scroll sensors 102 and 104. U.S. Pub. No. 2005/0259085 is hereby incorporated by reference for the general description of a ring scroll sensor such as ring scroll sensors 102 and 104. Ring scroll sensor 102 includes a closed circular-shaped resistor 106. Ring scroll sensor 104 includes a closed circular-shaped resistor 108.

Dual circular-shaped sensor 100 includes three types of conductive traces printed on the top surface of the bottom substrate. These traces include: drive lines 110, 112, 114, and 116; fixed-potential fingers 118; and a sense line 120 having an electrically contiguous set of traces 122. Drive line 110 is electrically connected to a first circumferential point of resistor 106 and is electrically connected to a first circumferential point of resistor 108. Drive line 114 is electrically connected to a second circumferential point of resistor 106 and is electrically connected to a second circumferential point of resistor 108. Drive line 112 is electrically connected to a third circumferential point of resistor 106. Drive line 116 is electrically connected to a third circumferential point of resistor 108.

Fingers 118 are electrically connected to and extend from resistors 106 and 108. The electrically contiguous traces 122 of sense line 120 are interdigitated with fingers 118. As such, sense line 120 is a single contiguous line that snakes among the fixed-potential fingers 118. The top substrate (not shown) of dual circular-shaped sensor 100 includes a conductive or resistive coating on its bottom surface. The top substrate is spaced apart from and adhered to the bottom substrate of dual circular-shaped sensor 100 by an adhesive spacer layer (not shown).

A center interaction zone 126 is formed near the center of dual circular-shaped sensor 100. Center interaction zone 126 has fingers 118 emanating from each resistor 106 and 108 towards the other resistor. These fingers 118 are interleaved with traces 122 extending from sense line portion 127 running through center interaction zone 126.

As such, each resistor 106 and 108 of interleaved ring scroll sensors 102 and 104 has three drive lines. More particularly, resistor 106 has drive lines 110, 112, and 114; and resistor 108 has drive lines 110, 114, and 116. The position of a touch on center interaction zone 126 can be determined by setting "high" the two drive lines nearest the center interaction zone of one ring scroll sensor (e.g., drive lines 110 and 114 of ring scroll sensor 102), setting "low" the two drive lines nearest the center interaction zone of the other ring scroll sensor (e.g., drive lines 110 and 114 of ring scroll sensor 104), and then measuring the voltage on sense line 120.

In addition to the various embodiments of touch input devices having two interleaved scroll sensors, such as cross-shaped sensor 40 with interleaved linear strip scroll sensors, dual arc-shaped sensor 90 with two interleaved linear strip scroll sensors, and dual circular-shaped sensor 100 with two interleaved ring scroll sensors, other touch input device embodiments include a serpentine embodiment having two interaction regions.

In addition, it is noted that the external geometry of a touch input device having interleaved scroll sensors in accordance with the present invention may not reflect the internal geometry of the touch input device. Further, the various embodiments of a touch input device in accordance with the present invention as disclosed herein encompass two scroll sensors which provide a center interaction region. It is noted that a touch input device in accordance with the present invention may have more than two interleaved scroll sensors (such as an integer "n" number of scroll sensors) in which case the touch input device would have multiple interaction regions (namely, an integer "n−1" number of interaction regions).

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A touch input device comprising:
   a bottom substrate;
   first and second resistors on the bottom substrate;
   a first pair of drive lines electrically connected to respective ends of the first resistor for applying a first drive voltage across the length of the first resistor between the ends of the first resistor independent of any voltage applied to the second resistor;
   a second pair of drive lines electrically connected to respective ends of the second resistor for applying a second drive voltage across the length of the second resistor between the ends of the second resistor independent of any voltage applied to the first resistor;
   a plurality of electrically conductive first finger traces on the bottom substrate, the first finger traces electrically connected to and extending from the first resistor at discrete points along the length of the first resistor such that when the first drive voltage is applied across the length of the first resistor while the second resistor is in an open circuit each first finger trace carries a voltage corresponding to the first drive voltage and the position of the first finger trace along the length of the first resistor;
   a plurality of electrically conductive second finger traces on the bottom substrate, the second finger traces electrically connected to and extending from the second resistor at discrete points along the length of the second resistor such that when the second drive voltage is applied across the length of the second resistor while the first resistor is in an open circuit each second finger trace carries a voltage corresponding to the second drive voltage and the position of the second finger trace all along the length of the second resistor;
   a top substrate spaced above the bottom substrate, the top substrate having an electrically conductive sense layer; and
   a sense line having an electrically contiguous set of electrically conductive sense finger traces on the bottom substrate, the sense finger traces being interdigitated with the first and second finger traces such that on the bottom substrate the sense finger traces are spaced apart and electrically disconnected from the first and second finger traces;
   wherein some of the first traces, some of the second traces, and some of the sense traces extend into an interaction zone on the bottom substrate between the first and second resistors;
   whereby pressure applied to either substrate adjacent the interaction zone towards the other substrate causes the conductive sense layer to contact one of the sense finger traces, one of the first finger traces, and one of the second finger traces in the interaction zone such that the contacted traces electrically connect via the sense layer;
   wherein when the first drive voltage is applied across the length of the first resistor while the second resistor is in an open circuit and while the contacted traces are electrically connected, the sense line has a first sense voltage which is the voltage carried by the contacted first trace;
   wherein when the second drive voltage is applied across the length of the second resistor while the first resistor is in an open circuit and while the contacted traces are electrically connected, the sense line has a second sense voltage which is the voltage carried by the contacted second trace;
   wherein the position of the applied pressure is determinable as a function of the first and second sense voltages.

2. The device of claim 1 wherein:
   some of the sense finger traces are located in a first zone on the bottom substrate away from the interaction zone near the first resistor, some of the first finger traces extend into the first zone and are interdigitated with the sense fingers located in the first zone and none of the second finger traces extend into the first zone.

3. The device of claim 2 wherein:
   some of the sense finger traces are located in a second zone on the bottom substrate away from the interaction zone near the second resistor, some of the second finger traces extend into the second zone and are interdigitated with the sense fingers located in the second zone and none of the first finger traces extend into the second zone.

4. The device of claim 1 wherein:
   the bottom substrate includes a cross-shaped section having a center region and four arms;
   wherein the first and second resistors respectively extend at right-angles through a respective pair of the arms, wherein the center region is interposed between the first and second resistors and includes the interaction zone.

5. The device of claim 4 wherein:
   some of the sense finger traces are located in the pair of the arms through which the first resistor extends, some of the first finger traces extend towards these arms and are interdigitated with the sense fingers located in these arms and none of the second finger traces are interdigitated with the sense fingers located in these arms;
   some of the sense fingers are located in the other pair of the arms through which the second resistor extends, some of the second finger traces extend towards these other arms and are interdigitated with the sense fingers located in these other arms and none of the first finger traces are interdigitated with the sense finger traces located in these other arms.

6. The device of claim 4 wherein:
   the position of the applied pressure determinable as a function of the first and second sense voltages is permitted to be mapped to X and Y coordinates relative to the cross-shaped section using look-up tables.

7. The device of claim 5 wherein:
   pressure applied to either substrate in one arm causes the conductive sense layer to contact at least one of the sense finger traces in the one arm and at least one of the first or second finger traces in the one arm such that the at least one of the sense finger traces in the one arm and the at least one of the first or second finger traces in the one arm electrically connect via the sense layer thus causing the resistor which extends through the one arm to effect the voltage on the sense line while the other resistor does not effect the voltage on the sense line;

wherein the position of the applied pressure is permitted to be determined from the voltage on the sense line and from the effect of the resistor extending through the one arm to the voltage on the sense line.

8. The device of claim 1 wherein:

each resistor is linear such that the resistance per unit length across the length of the resistor is substantially constant.

9. The device of claim 1 wherein:

the bottom substrate includes dual arc-shaped sections having a center region which includes the interaction zone, wherein the first and second resistors respectively extend at arcs with the center region being interposed between the first and second resistors.

10. The device of claim 9 wherein:

the position of the applied pressure determinable as a function of the first and second sense voltages is permitted to be mapped to X and Y coordinates relative to the dual arc-shaped sections using look-up tables.

11. The device of claim 1 wherein:

the bottom substrate includes dual circular-shaped sections, wherein the first and second resistors are circular and are positioned in respective circular-shaped sections with a center region of the dual circular-shaped sections being interposed between the first and second resistors, wherein the center region includes the interaction zone.

* * * * *